United States Patent
Croak et al.

(10) Patent No.: US 7,599,359 B1
(45) Date of Patent: Oct. 6, 2009

(54) METHOD AND APPARATUS FOR MONITORING END-TO-END PERFORMANCE IN A NETWORK

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 1047 days.

(21) Appl. No.: 11/011,255

(22) Filed: Dec. 14, 2004

(51) Int. Cl.
*H04L 12/66* (2006.01)

(52) U.S. Cl. .............. 370/356; 370/252; 370/331; 370/352; 370/401; 382/159; 705/11; 709/224; 709/230

(58) Field of Classification Search ............ 370/356, 370/252, 331, 352, 401; 379/134; 703/2; 382/159; 705/11; 709/224, 230
See application file for complete search history.

(56) References Cited

U.S. PATENT DOCUMENTS

| | | | |
|---|---|---|---|
| 6,359,976 B1 * | 3/2002 | Kalyanpur et al. ........ 379/134 |
| 6,633,555 B1 * | 10/2003 | Lu et al. .................... 370/331 |
| 6,665,271 B1 * | 12/2003 | Thomas et al. ............. 370/252 |
| 7,113,515 B2 * | 9/2006 | Hoffman .................... 370/401 |
| 7,143,159 B1 * | 11/2006 | Grace et al. ................ 709/224 |
| 7,454,494 B1 * | 11/2008 | Hedayat et al. ............ 709/224 |
| 7,457,732 B2 * | 11/2008 | Aragones et al. ............. 703/2 |
| 2003/0076820 A1 * | 4/2003 | Hoffmann ................... 370/356 |
| 2003/0091026 A1 * | 5/2003 | Penfield et al. ............. 370/352 |
| 2004/0255040 A1 * | 12/2004 | Lopes et al. ................ 709/230 |
| 2005/0055370 A1 * | 3/2005 | Fukuda et al. .......... 707/103 X |
| 2005/0114432 A1 * | 5/2005 | Hodges et al. ............. 709/201 |
| 2006/0041467 A1 * | 2/2006 | Canfield ........................ 705/11 |
| 2006/0133666 A1 * | 6/2006 | Liu et al. .................... 382/159 |

* cited by examiner

*Primary Examiner*—Gerald Gauthier

(57) ABSTRACT

The present invention enables edge components, such as Border Elements, of the service provider's network to capture performance data on all endpoints connected to them including registered devices (e.g., CPE gateways, IP phones, and terminal adaptors) and access links. The present invention enables the performance data to be sent to a centralized repository that consolidates information across the entire network, analyzes it, and segments it with respect to location of events that cause defects in calls. The performance data can then be graphically mapped into predefined network segmentations to enable faster identification and resolution of network problems.

4 Claims, 4 Drawing Sheets

METHOD AND APPARATUS FOR MONITORING END-TO-END PERFORMANCE IN A NETWORK

The present invention relates generally to communication networks and, more particularly, to a method and apparatus for monitoring end-to-end performance in a packet-switched network, e.g., a Voice over Internet Protocol (VoIP) network.

BACKGROUND OF THE INVENTION

VoIP network operators who are trying to achieve a high level of service availability need to monitor their network from an end-to-end view. Current error detection tools typically monitor the service provider's core portion of the network, ignore access portions of the network and have ambiguous categorization of access network defects. Very often, performance data showing a healthy core network does not necessarily mean a healthy access network. From a customer point of view, network providers who only monitor core network performance often does not provide the same view of the end-to-end performance of the services experienced by the customer.

Therefore, a need exists for a method and apparatus for monitoring end-to-end performance in a packet-switched network, e.g., a Voice over Internet Protocol (VoIP) network.

SUMMARY OF THE INVENTION

In one embodiment, the present invention enables edge components, such as Border Elements, of the service provider's network to capture performance data on all endpoints connected to them including registered devices (e.g., CPE gateways, IP phones, and terminal adaptors) and access links. Broadly defined, the Border Element is a network element that represents the edge of a VoIP network and serves as a gateway between a customer's network, a VoIP network, and a Public Switched Telephone Network (PSTN). The present invention enables the performance data to be sent to a centralized repository that consolidates information across the entire network, analyzes it, and segments it with respect to location of events that cause defects in calls. The performance data can then be graphically mapped into predefined network segmentations to enable faster identification and resolution of network problems. Furthermore, the tool would enable the refinement of a generic and ambiguous defect code indicating "resource unavailable" to distinguish between Customer Premise Equipment (CPE) errors, access link errors, customer gateway errors, or voice mail errors.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
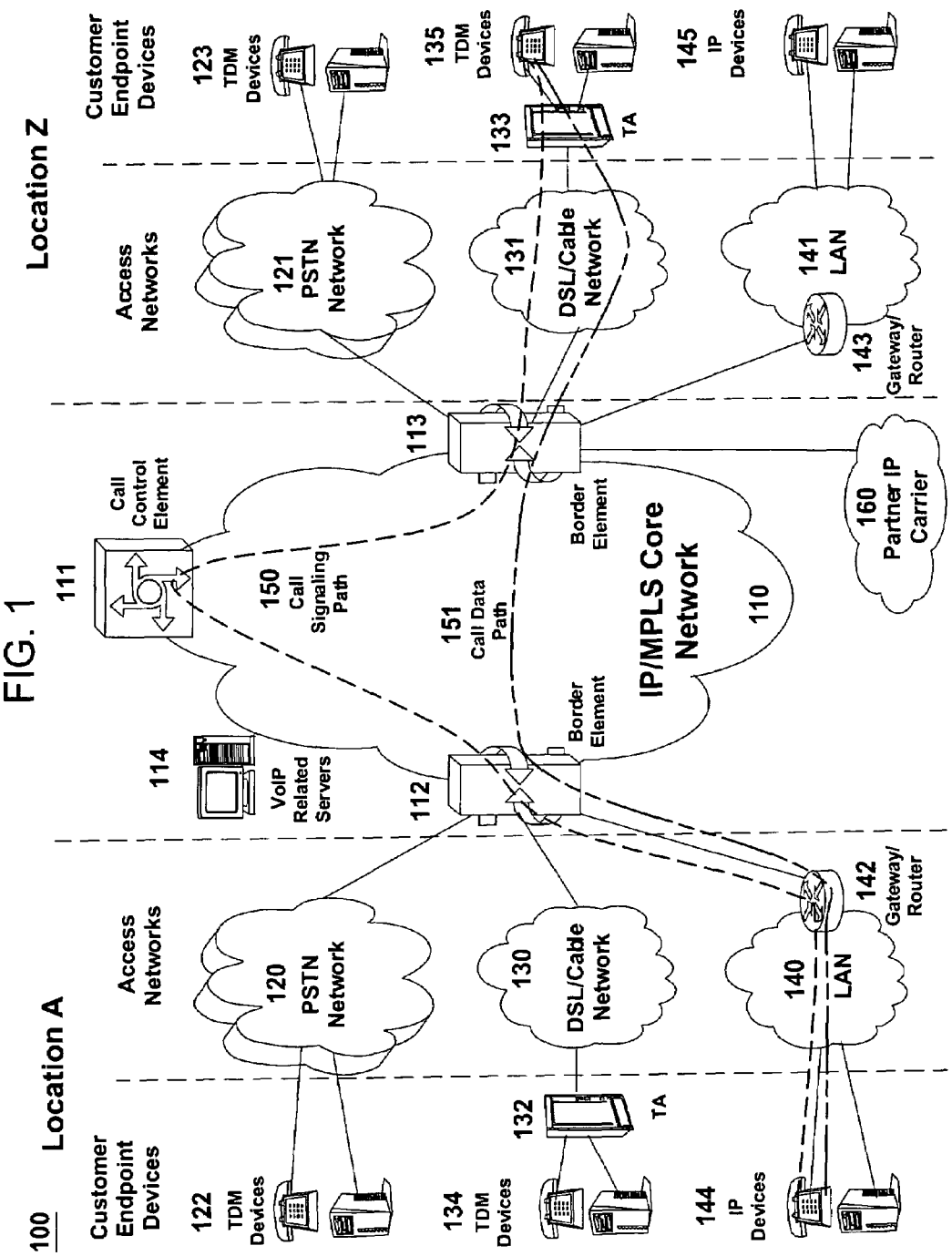
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Packet-switched network operators, e.g., VoIP network operators who are trying to achieve a high level of service availability need to monitor their network from an end-to-end view. Current error detection tools typically monitor the service provider's core portion of the network, ignore access portions of the network and have ambiguous categorization of access network defects. Very often, performance data showing a healthy core network does not necessarily mean a healthy access network. From a customer point of view, network providers who only monitor core network performance often does not provide the same view of the end-to-end performance of the services experienced by the customer.

To address this criticality, the present invention enables edge components, such as Border Elements, of the service provider's network to capture performance data on all endpoints connected to them including registered devices (e.g., CPE gateways, IP phones, and terminal adaptors) and access links. Broadly defined, the Border Element is a network element that represents the edge of a VoIP network and serves as a gateway between a customer's network, a VoIP network, and a Public Switched Telephone Network (PSTN). The present invention enables the performance data to be sent to a centralized repository that consolidates information across the entire network, analyzes it, and segments it with respect to location of events that cause defects in calls. The performance data can then be graphically mapped into predefined network segmentations to enable faster identification and resolution of network problems. Furthermore, the tool would enable the refinement of a generic and ambiguous defect code indicating "resource unavailable" to distinguish between Customer Premise Equipment (CPE) errors, access link errors, customer gateway errors, or voice mail errors.

Figure 2:
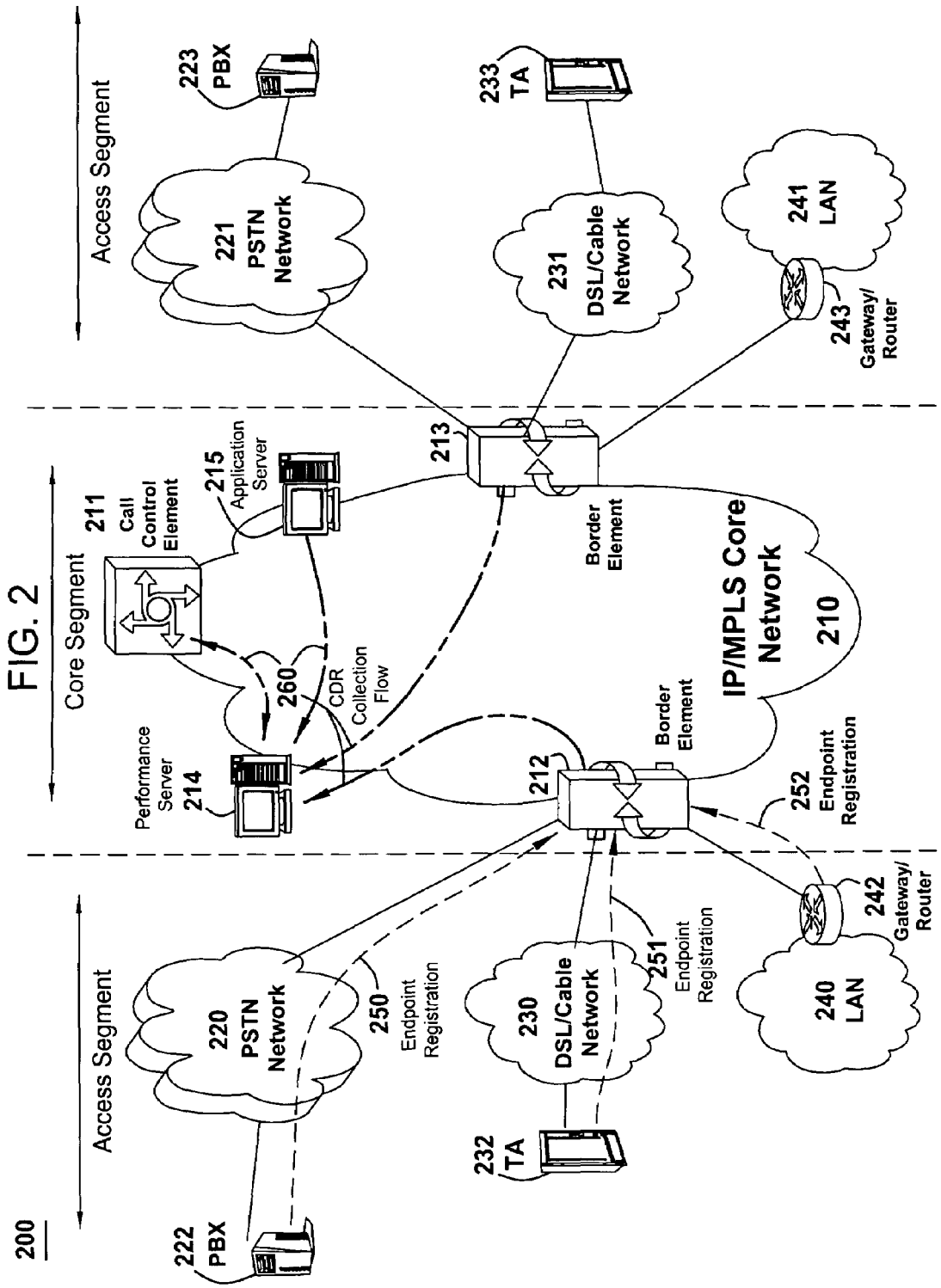
FIG. 2 illustrates an example of the monitoring of end-to-end performance in a Voice over Internet Protocol (VoIP) network of the present invention.

FIG. 2 illustrates an example of the monitoring of end-to-end performance in a packet-switched network, e.g., a Voice over Internet Protocol (VoIP) network of the present invention. FIG. 2 shows that network 200 has been divided into segments, e.g., a core segment and a plurality of access segments. In one embodiment, the access segment extends from the customer endpoints to the BE. The core segment comprises all VoIP network elements, such as BEs 212, 213, CCE 211, and all VoIP related servers 214, 215 as well as the underlying MPLS/IP infrastructure 210.

Various network elements in a VoIP network continuously collect Call Detail Record (CDR) data for every call processed within the network. Broadly defined, the CDR comprises signaling and media performance data. For example, CDR is data associated with a telephone call, including the calling and the called numbers, the date and timestamp, the duration, the call setup delay, the final handling code, along with other performance related data, such as packet lost and delay etc, of the telephone call. The final handling code is the code that indicates whether a call has been completed successfully, blocked or cut off. Every call made using the VoIP network creates one CDR at each network element involved in the call. A CDR created at BE 212 and 213 for a particular telephone call contain signaling and media path performance information related to the edge of the network, while a CDR created at CCE 211 for the same telephone call contain signaling performance information more related to the core of the network. CDR is created on a per call basis. In other words, there is only one CDR created for a telephone call for each network element involved in the call.

In order to monitor end-to-end performance for a call, not only performance data within the core segment of the network need to be collected, performance data from the access segment of the network also need to be collected. To take into account of access segment performance data, customer endpoints need to be registered with the corresponding BEs so that access related performance data between customers endpoints and corresponding BEs can be collected. Defect components, e.g., access segment defects include, but are not limited to, CPE errors, access link errors, customer gateway errors, and even voice mail errors, which all contribute to end-to-end performance degradation. Event 250 shows the endpoint registration of PBX 222 with BE 212; event 251 shows the endpoint registration of TA 232 with BE 212; and event 252 shows the endpoint registration of customer gateway/router 242 with BE 212. Similarly, BE 213 registers all customer endpoints supported by it. Once the registration of customer endpoints is done, BEs 212 and 213 can begin performance monitoring of the access segment with detailed defect categorization to distinguish the different types of access defects, in addition to the performance monitoring of the core segment of the network.

All network elements within network 200 forward completed CDR data to the Performance Server (PS) 214 for further analysis and processing. Flow 260 shows the collected CDR flow from BE 212, BE 213, CCE 211, and Application Server (AS) 215 to PS 214. PS 214 processes and analyzes all collected CDR data from all network elements to provide an end-to-end view of the network performance. Particularly, PS 214 will consolidate all CDR data associated with a particular call to construct the end-to-end performance view of the call. For instance, a call involves the use of BEs 212, 213, CCE 211, and AS 215. CDR data collected by BEs 212 and 213 comprises edge and access related signaling and media performance data. CDR data collected by CCE 211 and AS 215 comprises core related signaling performance data. PS 214 will put together the CDR data with views from different part of the network to construct an end-to-end performance view of the call. With the end-to-end performance view in place, the performance data can be presented and displayed showing detailed defect codes reflecting problems mapped onto the defect contributing network equipment. This will provide much faster defect identification as well as resolution of network problems.

It should be noted the network components shown in FIG. 2 are only illustrative. As such, there can be any number of endpoints, BEs, CCEs, ASs, and PSs in the network 200.

Figure 3:
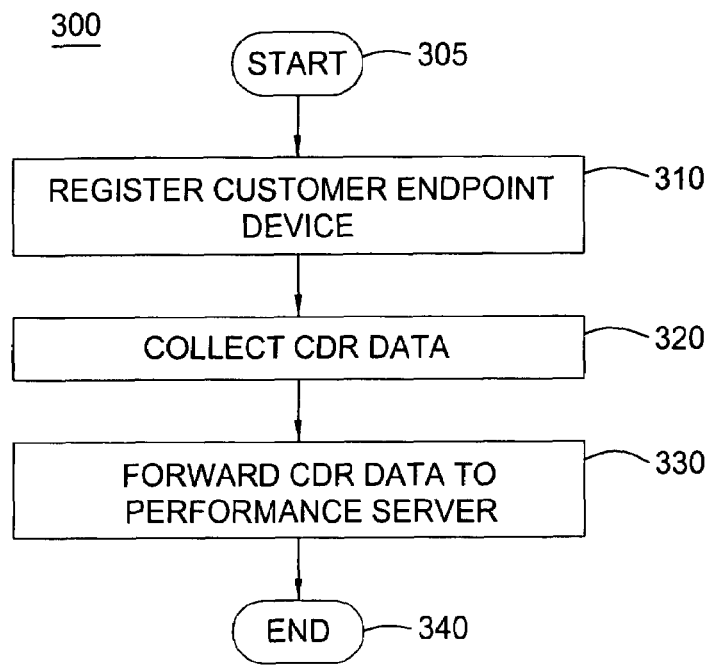
FIG. 3 illustrates a flowchart of a method for collecting performance data by network elements of the present invention.

FIG. 3 illustrates a flowchart of a method 300 for collecting performance data by network elements. Network elements include BE, CCE, AS and the like. Method 300 starts in step 305 and proceeds to step 310.

In step 310, the method registers the endpoints supported by the network elements. In one embodiment, the endpoints may comprise a PBX, a TA, a customer gateway, a customer router and the like.

In step 320, the method collects per call CDR data for all calls processed by each network element. In step 330, the method forwards all completed CDR data to the Performance Server for further analysis and processing. The method ends in step 340.

Figure 4:
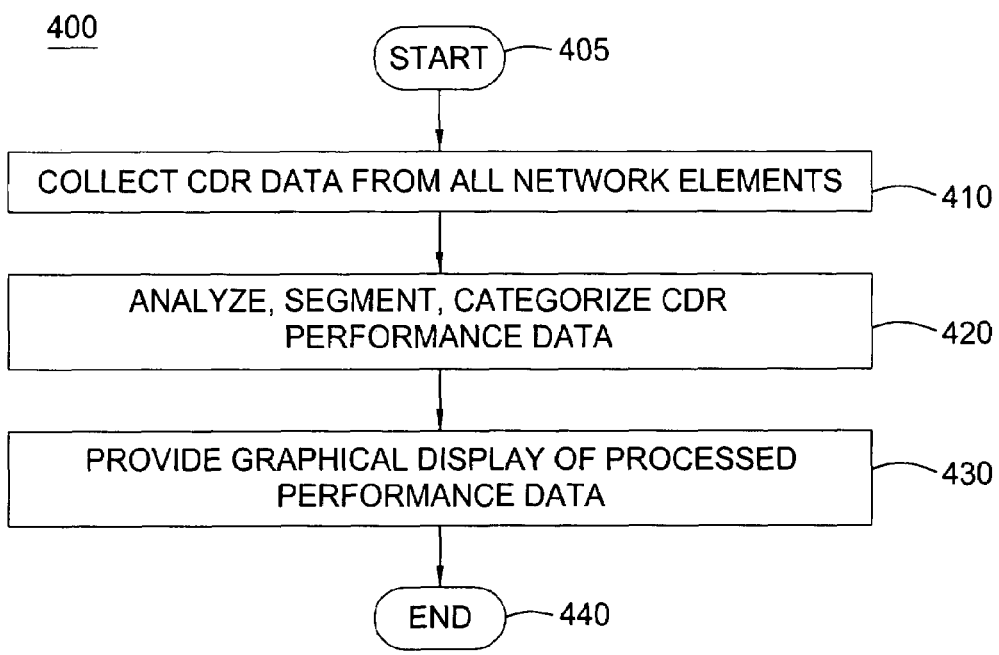
FIG. 4 illustrates a flowchart of a method for analyzing collected performance data by a Performance Server (PS) of the present invention.

FIG. 4 illustrates a flowchart of a method 400 for analyzing collected performance data by the Performance Server (PS). Method 400 starts in step 405 and proceeds to step 410.

In step 410, the method collects all completed CDR data from all network elements. In step 420, the method analyzes and processes the collected CDR data to provide end-to-end performance views of calls made. The end-to-end performance data are segmented to represent core and access segments performance data. For access segment performance data, the method further refines access defects to distinguish between different types of defects including, but are not limited to, CPE errors, access link errors, customer gateway errors, and voice mail errors.

In step 430, the method provides a graphical display of the end-to-end performance data to the network operator. The display includes defect codes reflecting problems mapped onto the contributing network equipment. For example, the graphical display may comprise a display that shows the network with the core segment with a plurality of access segments, e.g., similar to the illustrations as shown in FIG. 1 and FIG. 2. In turn, the defect codes can be graphically superimposed onto the display to indicate the location and type of detected defects. Highlighting or flashing can be deployed in the display to assist in the location of the detected defects. Thus, the performance data is being graphically mapped onto predefined network segmentations to enable faster identification and resolution of network problems.

Figure 5:
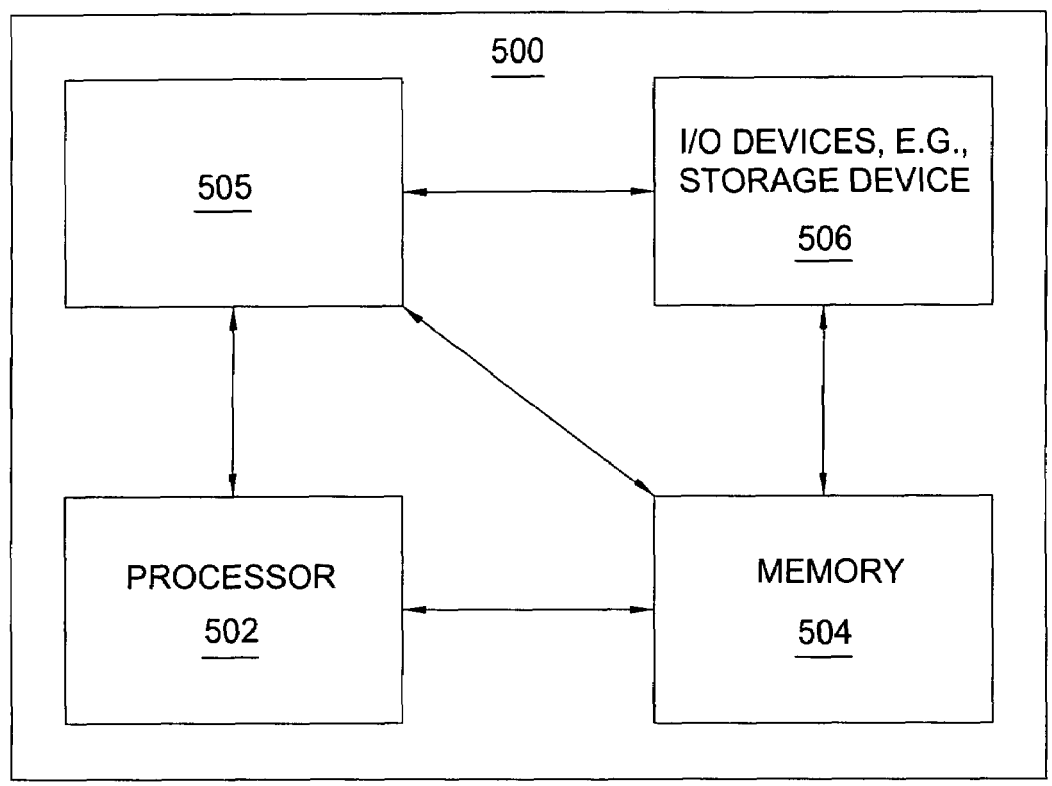
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a end-to-end performance monitoring module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present end-to-end performance monitoring module or process 505 can be loaded into memory 504 and executed by processor 502 to implement the functions as discussed above. As such, the present end-to-end performance monitoring process 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for monitoring end-to-end performance data in a communication network, where said communication network comprises a core segment and at least one access segment, comprising:

collecting at least one of: signaling data or media performance data via Call Detail Record (CDR) data from a plurality of network elements; and segmenting said collected media performance data into performance data associated with said core segment and performance data associated with said at least one access segment, where said performance data associated with said core segment and said performance data associated with said at least one access segment make up the end-to-end performance data, wherein said segmenting comprises:

categorizing at least one defect component from said performance data associated with said core segment and said performance data associated with said at least one access segment; and mapping said at least one defect component onto at least one of corresponding: said core segment or said at least one access segment.

2. The method of claim 1, wherein said at least one defect component comprises at least one of: a customer premise error, an access link error, a customer gateway error, or a voice mail error.

3. A computer-readable medium having stored thereon a plurality of instructions, the plurality of instructions including instructions which, when executed by a processor, cause the processor to perform the steps of a method for monitoring end-to-end performance data in a communication network, where said communication network comprises a core segment and at least one access segment, comprising:

collecting at least one of: signaling data or media performance data via Call Detail Record (CDR) data from a plurality of network elements; and segmenting said collected media performance data into performance data associated with said core segment and performance data associated with said at least one access segment, where said performance data associated with said core segment and said performance data associated with said at least one access segment make up the end-to-end performance data, wherein said segmenting comprises:

categorizing at least one defect component from said performance data associated with said core segment and said performance data associated with said at least one access segment; and mapping said at least one defect component onto at least one of corresponding: said core segment or said at least one access segment.

4. The computer-readable medium of claim 3, wherein said at least one defect component comprises at least one of: a customer premise error, an access link error, a customer gateway error, or a voice mail error.

* * * * *